(12) United States Patent
Pniewski et al.

(10) Patent No.: US 10,173,488 B2
(45) Date of Patent: Jan. 8, 2019

(54) AIR SPRING HANGING PISTON BEARING

(71) Applicant: Continental Automotive Systems, Inc., Auburn Hills, MI (US)

(72) Inventors: Garrett Mark Pniewski, Bloomfield Hills, MI (US); Joseph G Jerisk, Burton, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 15/369,043

(22) Filed: Dec. 5, 2016

(65) Prior Publication Data
US 2018/0154725 A1    Jun. 7, 2018

(51) Int. Cl.
| | | |
|---|---|---|
| F16F 9/04 | (2006.01) | |
| B60G 15/12 | (2006.01) | |
| F16F 9/084 | (2006.01) | |
| B60G 11/27 | (2006.01) | |
| B60G 13/08 | (2006.01) | |

(52) U.S. Cl.
CPC .............. *B60G 15/12* (2013.01); *B60G 11/27* (2013.01); *B60G 13/08* (2013.01); *F16F 9/084* (2013.01); *B60G 2202/152* (2013.01); *B60G 2204/1262* (2013.01); *B60G 2204/418* (2013.01); *F16F 2230/0023* (2013.01)

(58) Field of Classification Search
CPC .............. F16F 9/04; B60G 11/27; B60G 15/14
USPC .......................... 267/64.24, 220; 188/321.11; 280/124.15–124.17
See application file for complete search history.

(56) References Cited

U.S. PATENT DOCUMENTS

| | | | | |
|---|---|---|---|---|
| 4,325,541 A | * | 4/1982 | Korosladanyi ........ | B60G 11/27 267/220 |
| 4,555,096 A | * | 11/1985 | Pryor .................... | B60G 15/14 267/220 |
| 5,009,401 A | * | 4/1991 | Weitzenhof ............ | B60G 15/14 188/321.11 |
| 6,227,527 B1 | * | 5/2001 | Berg ...................... | B60G 15/14 267/218 |
| 6,286,820 B1 | * | 9/2001 | Raulf ..................... | B60G 15/14 267/64.21 |
| 7,487,957 B2 | * | 2/2009 | Brunneke ............... | B60G 15/14 188/321.11 |
| 8,800,975 B2 | * | 8/2014 | Moulik ................... | B60G 15/14 267/64.24 |

(Continued)

*Primary Examiner* — Christopher P Schwartz

(57) ABSTRACT

An air spring assembly for a vehicle having a damper body which is decoupled from a piston, allowing the damper to rotate freely without inducing torsion into the piston. The air spring assembly includes a damper body, and a decoupling mechanism connected to the damper body, where a portion of the decoupling mechanism surrounds the damper body. A piston is connected to the decoupling mechanism such that the decoupling mechanism allows for rotation of the damper body relative to the piston, preventing torsion from being transferred from the damper body to the piston. The decoupling mechanism also includes a rotatable machine element, such as a bearing, surrounding the damper body, and the bearing is adjacent the cup portion such that the rotatable machine element facilitates relative rotation between the damper body and the spring cup portion to limit torsion applied to the piston from the damper body.

19 Claims, 2 Drawing Sheets

(56) References Cited

U.S. PATENT DOCUMENTS

2008/0136072 A1* 6/2008 Kolb ..................... B60G 11/28
267/140.11

* cited by examiner

AIR SPRING HANGING PISTON BEARING

FIELD OF THE INVENTION

The invention relates generally to an air spring assembly which is more tolerant of torsion induced by vehicle kinematics.

BACKGROUND OF THE INVENTION

Suspension systems for automotive vehicles provide vehicle passengers with a more comfortable ride. Aft suspension systems utilize air springs, rather than traditional coil springs. Air suspension systems provide different suspension qualities that may be preferable in some vehicles to traditional coil spring suspensions.

A conventional aft spring is a device that is arranged between a vehicle body and chassis. The typical air spring has at least one working space, or cavity that is filled with compressed air. Air spring pistons typically seal the aft chamber against a hydraulic shock absorber (damper). Vehicle kinematics may induce torsion into the air spring assembly during the operation of the vehicle. Many air spring systems are limited by the amount of torsion they are able to withstand, and are not equipped to handle torsion levels above a certain threshold.

Accordingly, there exists a need for an air spring assembly which is able to tolerate increased levels of torsion induced by vehicle kinematics.

SUMMARY OF THE INVENTION

The present invention is an air spring assembly for a vehicle having a damper body which is decoupled from a piston, allowing the damper to rotate freely without inducing torsion into the piston.

In one embodiment, the present invention is an air spring assembly which includes a damper body, and a decoupling mechanism connected to the damper body, where a portion of the decoupling mechanism surrounds the damper body. A piston is connected to the decoupling mechanism such that the decoupling mechanism allows for rotation of the damper body relative to the piston, preventing torsion from being transferred from the damper body to the piston.

The decoupling mechanism includes a cup portion connected to the damper body, such that a portion of the damper body extends into the cup portion. The piston is adjacent the cup portion when the decoupling mechanism is attached to the damper body and the piston is attached to the decoupling mechanism.

The cup portion includes a base portion, a sidewall integrally formed with the base portion, and a cavity. The base portion and the sidewall form the cavity, and a portion of the damper body is located in the cavity when the damper body is connected to the decoupling mechanism. The piston includes a lower wall, and the lower wall is in contact with the base portion when the piston is connected to the decoupling mechanism.

The decoupling mechanism also includes a rotatable machine element, such as a bearing, surrounding the damper body, the rotatable machine element being adjacent the cup portion such that the rotatable machine element facilitates relative rotation between the damper body and the cup portion. The cup portion also includes a plurality of ribs, and each of the plurality of ribs is in contact with the rotatable machine element when the rotatable machine element is disposed in the cup portion.

In one embodiment, the rotatable machine element is a bearing, however, it is within the scope of the invention that other types of rotatable machine elements may be used, such as, but not limited to, a ball bearing, a needle bearing, a journal bearing, a bushing, or the like.

The decoupling mechanism includes a snap ring connected to the damper body, the snap ring positioning the rotatable machine element relative to the damper body and cup portion. In one embodiment, the snap ring and the bearing may be positioned such that when the cup portion is placed onto the damper body, the base portion is in minimal or no contact with the top surface of the damper body.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
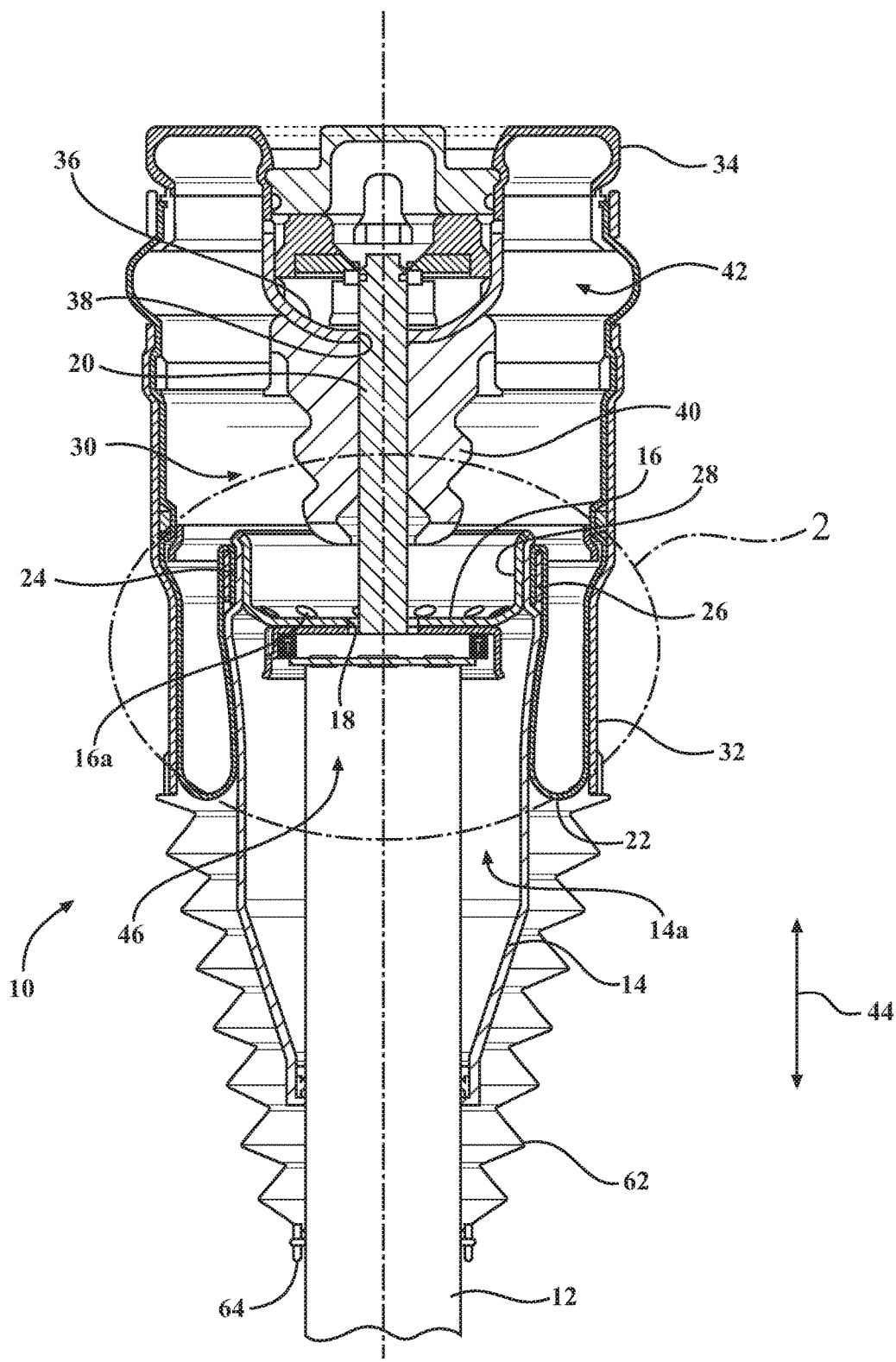
FIG. 1 is a sectional view of an air spring assembly, according to embodiments of the present invention.

An air spring for a vehicle, where the air spring has a reservoir according to the present invention is shown in FIG. 1, generally at 10. The air spring 10 includes a damper body 12, and surrounding a portion of the damper body 12 is an outer piston 14. The outer piston 14 is connected to an inner piston 16, which is connected to the damper body 12 as shown. The inner piston 16 includes an aperture 18, and extending through the aperture 18 is a damper rod 20. The air spring 10 also includes a bellows 22, which is flexible and able to change shape as the pistons 14,16 are moved relative to the damper rod 20. A free end 24 of the bellows 22 is clamped between a clamping ring 26 and a portion of the outer piston 14, and is adjacent a flange portion 28 of the inner piston 16.

The bellows 22 includes a cavity, shown generally at 30, which is generally filled with air. The cavity 30 of the bellows 22 is in fluid communication with a cavity, shown generally at 14a, formed as part of the outer piston 14. The cavity 30 is in fluid communication with the cavity 14a through several apertures 16a formed as part of the inner piston 16. The bellows 22 is partially surrounded by a guide tube 32, and the guide tube 32 and the bellows 22 are connected to a top cap 34. The top cap 34 includes a base portion 36, and extending through an aperture 38 in the base portion 36 is the damper rod 20. The damper rod 20 also extends through a jounce bumper 40, which is partially surrounded by, and connected, to the top cap 34.

The top cap 34 also has a cavity, shown generally at 42, which is in fluid communication with the cavity 30 of the bellows 22 and the cavity 14a of the inner piston 14 such that the cavities 14a,30,42 function collectively as a single volume.

The top cap 28 is connected to another component of the vehicle, such the frame of the vehicle, but it is within the scope of the invention that the top cap 28 may be connected to other components of the vehicle as well. Additionally, the damper body 12 is connected to another part of the suspension system of the vehicle, such as an A-arm, or swing arm. As the A-arm moves from (operation of the vehicle) the damper body 12 and piston 14 move in either of the directions indicated by arrow 44 relative to the damper rod 20.

As the vehicle is in operation, and travelling, there may be instances where the vehicle kinematics induce torsion into the air spring assembly 10.

Figure 2:
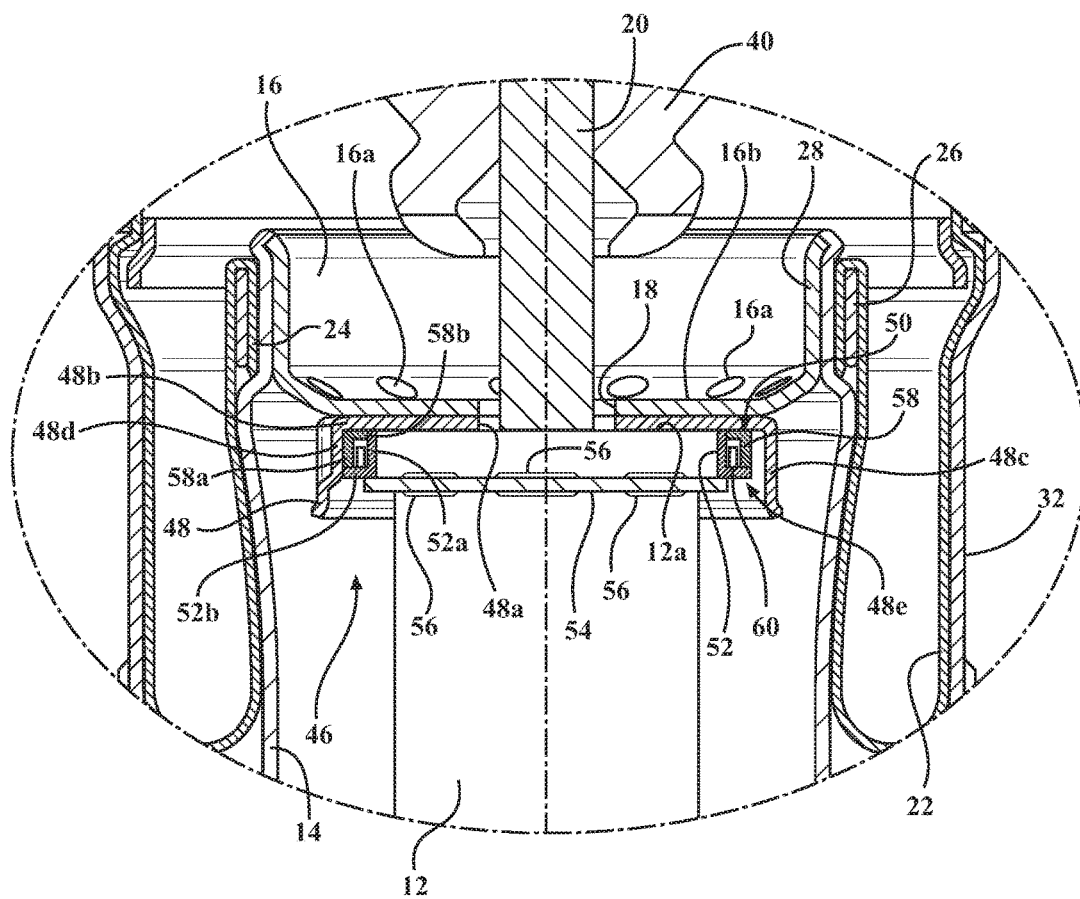
FIG. 2 an enlarged view of the circled portion of FIG. 1, according to embodiments of the present invention.

The air spring assembly 10 includes a decoupling mechanism, shown generally at 46 in FIGS. 1 and 2. The decoupling mechanism 46 reduces or eliminates the transfer of torsion from the damper body 12 to the piston 16. The mechanism 46 includes a cup portion 48 mounted to a top surface 12a of the damper body 12. The cup portion 48 also includes an aperture 48a through which the damper rod 20 extends. Additionally, the cup portion 48 includes base portion 48b integrally formed with a sidewall 48c, where the aperture 48a is formed as part of the base portion 48b. Together, the base portion 48b and the sidewall 48c form a cavity, shown generally at 48e. The base portion 48b is mounted to the top surface 12a of the damper body 12, such that a portion of the damper body 12 is disposed in the cavity 48e. Integrally formed with the flange portion 28 of the inner piston 16 is a lower wall 16b, which is in contact with the base portion 48b. The aperture 18 of the inner piston 16 is in alignment with the aperture 48a of the cup portion 48 such that the damper rod 20 extends through both apertures 18,48a.

The mechanism 46 also includes a rotatable machine element, shown generally at 50, which in this embodiment is a bearing 50. The bearing 50 includes an inner race 52 having two wall portions 52a,52b, with the first wall portion 52a in contact with the damper body 12, and the second wall portion 52b in contact with a snap ring 54. The snap ring 54 has a plurality of teeth (not shown) is disposed in a plurality of corresponding grooves 56, so as to properly locate the bearing 50 relative to the cup portion 48, and make sure the bearing is adjacent the base portion 48b. The bearing 50 also includes an outer race 58 having a first wall 58a in contact with a plurality of ribs 48d formed as part of the sidewall 48c, and a second wall 58b in contact with the base portion 48b. The sidewall 48c of the cup portion 48 has a larger diameter than the diameter of the damper body 12. More specifically, the inner diameter of the ribs 48d is larger than the outer diameter of the outer race 58 such that there is a press-fit connection between the ribs 48d and the first wall 58a of the outer race 58. There is also a press-fit connection between the damper body 12 and the wall portion 52a of the inner race 52, such that the base portion 48b of the cup portion 48 is in contact with the top surface 12a of the damper body 12. Disposed between the inner race 52 and the outer race 58 is a plurality of bearing members 60, which facilitate relative rotation between the inner race 52 and the outer race 58.

The air spring assembly 10 also includes a flexible outer cover, which in this embodiment is a gaiter 62. The gaiter 62 is connected to the guide tube 32, and is also held in place by a clip 64 connected to the damper body 12. The gaiter 62 flexes and moves as the damper body 12 and pistons 14,16 move during travel of the vehicle.

During vehicle travel, there are instances where torsion is induced to the air spring assembly 10. This torsion is typically induced to the air spring assembly 10 as the damper body 12 is subjected to different torsions from other components in the suspension system. The damper body 12, the snap ring 54, and the inner race 52 of the bearing 50 rotate relative to the outer race 58 of the bearing 50, the cup portion 48, and the piston 16. The bearing 54 facilitates the rotation of the damper body 12 relative to the cup portion 48 and the piston 16, and because the damper body 12 is able to rotate relative to the cup portion 48 and the piston 16, this relative movement reduces or eliminates the torsion that is induced to the piston 16 from the damper body 12 by other suspension system components.

Also, as the damper body 12 is rotated when exposed to torsion from the suspension system, the base portion 48b of the cup portion 48 rotates relative to the top surface 12a of the damper body 12. Because the base portion 48b of the cup portion 48 rotates relative to the top surface 12a of the damper body 12, there is friction between the base portion 48b and the top surface 12a of the damper body 12 that may induce torsion to the cup portion 48 and piston 16. However, in other embodiments, the grooves 56 for the snap ring 54 may be located to position the snap ring 54 and the bearing 50 such that when the cup portion 48 is placed onto the damper body 12, the base portion 48b is in minimal or no contact with the top surface 12a of the damper body 12, reducing or eliminating any torsion induced to the cup portion 48 and piston 16.

While the rotatable machine element 54 has been described as being a bearing, it is within the scope of the invention that other types of rotatable machine elements 54 may be used, such as, but not limited to, a ball bearing, a needle bearing, a journal bearing, a bushing, or the like.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An apparatus comprising:
   an air spring assembly, including:
   a damper body;
   a decoupling mechanism connected to the damper body, a portion of the decoupling mechanism surrounding the damper body, the decoupling mechanism including at least one bearing member is disposed between an inner race and an outer race, the inner racer and outer race disposed within a cup portion such that the inner race is in contact with the damper body and an outer race is connected to the cup portion; and
   a piston connected to the cup portion of the decoupling mechanism; wherein the inner race is moveable relative to the outer race of the decoupling mechanism to allow rotation of the damper body relative to the piston, preventing torsion from being transferred from the damper body to the piston.

2. The apparatus of claim 1, the decoupling mechanism further comprising the damper body extending into the cup portion.

3. The apparatus of claim 2, wherein the piston is adjacent the cup portion when the decoupling mechanism is attached to the damper body and the piston is attached to the decoupling mechanism.

4. The apparatus of claim 2, the cup portion further comprising:
   a base portion;
   a sidewall integrally formed with the base portion; and
   a cavity, the base portion and the sidewall forming the cavity; wherein a portion of the damper body is located in the cavity when the damper body is connected to the decoupling mechanism.

5. The apparatus of claim 4, the piston further comprising a lower wall, wherein the lower wall is in contact with the base portion when the piston is connected to the decoupling mechanism.

6. The apparatus of claim 2, the cup portion further comprising a plurality of ribs, each of the plurality of ribs in contact with the rotatable machine element when the rotatable machine element is disposed in the cup portion.

7. The apparatus of claim 2, the at least one bearing member being one selected from the group consisting of a ball bearing, a needle bearing, and a bushing.

8. The apparatus of claim 2, the decoupling mechanism further comprising a snap ring connected to the damper body, the snap ring positioning the at least one bearing member relative to the damper body and cup portion.

9. The apparatus of claim 1, wherein the rotation of the damper body relative to the piston is about a longitudinal axis of the damper body.

10. The apparatus of claim 1, wherein the at least one bearing member is one of a ball, a needle, a journal, and a bushing.

11. A decoupling mechanism for an air spring assembly, comprising:
    a damper body being part of the air spring assembly;
    a cup portion supported on the damper body, the cup portion being part of the decoupling mechanism;
    a piston connected to the cup portion, the piston being part of the air spring assembly; and
    at least one bearing member disposed in the cup portion, connected to and surrounding a portion of the damper body, the at least one bearing member disposed between an inner bearing race supported on the damper body and an outer bearing race connected to the cup portion wherein the at least one bearing member facilitates relative rotation between the damper body and the cup portion, preventing torsion from being transferred from the damper body the piston.

12. The decoupling mechanism of claim 11, the cup portion further comprising:
    a base portion;
    a sidewall integrally formed with the base portion; and
    a cavity, the base portion and the sidewall forming the cavity; wherein a portion of the damper body is located in the cavity when the damper body is connected to the decoupling mechanism.

13. The decoupling mechanism of claim 12, the base portion of the cup portion in contact with damper body when the decoupling mechanism is attached to the damper body.

14. The decoupling mechanism of claim 12, the cup portion further comprising a plurality of ribs formed as part of the base portion, each of the plurality of ribs in contact with the outer bearing race.

15. The decoupling mechanism of claim 11, the piston further comprising a lower wall, wherein the lower wall is in contact with the cup portion when the piston is connected to the decoupling mechanism.

16. The decoupling mechanism of claim 11, the at least one bearing member being one selected from the group consisting of a ball bearing, a needle bearing, and a bushing.

17. The decoupling mechanism of claim 11, the decoupling mechanism further comprising a snap ring connected to the damper body, the snap ring positioning the inner bearing race relative to the damper body and cup portion.

18. The decoupling mechanism of claim 11, wherein the rotation of the damper body relative to the piston is about a longitudinal axis of the damper body.

19. The decoupling mechanism of claim 11, wherein the at least one bearing member is one of a ball, a needle, a journal, and a bushing.

* * * * *